(12) United States Patent
Al Mahmoud et al.

(10) Patent No.: US 11,201,732 B1
(45) Date of Patent: Dec. 14, 2021

(54) PRIVATE AND PUBLIC KEY EXCHANGE METHOD PREVENTING MAN-IN-THE-MIDDLE ATTACK WITHOUT ELECTRONIC CERTIFICATE AND DIGITAL SIGNATURE

(71) Applicants: Qassim Mohammed Soliman Al Mahmoud, Abha (SA); Suleiman Abdallah Suleiman Odat, Roselle Park, NJ (US); Fawaz Abdulrahman Mohammed Alsheri, Abha (SA); Haytham Eltayeb Elwaseila, Abha (SA)

(72) Inventors: Qassim Mohammed Soliman Al Mahmoud, Abha (SA); Suleiman Abdallah Suleiman Odat, Roselle Park, NJ (US); Fawaz Abdulrahman Mohammed Alsheri, Abha (SA); Haytham Eltayeb Elwaseila, Abha (SA)

( * ) Notice: Subject to any disclaimer, the term of this patent is extended or adjusted under 35 U.S.C. 154(b) by 0 days.

(21) Appl. No.: 16/909,658

(22) Filed: Jun. 23, 2020

(51) Int. Cl.
*H04L 9/08* (2006.01)
*H04L 9/32* (2006.01)
*H04L 9/06* (2006.01)

(52) U.S. Cl.
CPC .......... *H04L 9/0825* (2013.01); *H04L 9/0631* (2013.01); *H04L 9/0869* (2013.01); *H04L 9/3252* (2013.01)

(58) Field of Classification Search
None
See application file for complete search history.

(56) References Cited

U.S. PATENT DOCUMENTS

| | | | |
|---|---|---|---|
| 6,813,357 B1 * | 11/2004 | Matsuzaki | H04L 9/085 380/278 |
| 10,630,467 B1 * | 4/2020 | Gilbert | H04L 9/0844 |
| 2010/0008508 A1 * | 1/2010 | Girao | H04L 9/0841 380/278 |
| 2010/0232603 A1 * | 9/2010 | Itoh | G06F 7/723 380/30 |
| 2014/0233740 A1 * | 8/2014 | Niamut | H04L 9/3013 380/279 |

* cited by examiner

*Primary Examiner* — Cheng-Feng Huang
*Assistant Examiner* — Bassam A Noaman
(74) *Attorney, Agent, or Firm* — Walter J. Tencza, Jr.

(57) ABSTRACT

An apparatus, process, and system, that enables secure information and communication across channels based on a perfect key-exchange method. The secure channel between two users enables each to use the public key of the other user—to derive a secret key specific to both users. Traditional (but yet widely used) key-exchange methods are not perfect-secure; the public key encryption makes these methods to be broken under many kinds of attacks. Unlike these methods, the apparatus, process, and system of the present invention is not based on the computational assumptions like: Integer Factorization and Discrete Logarithm Problem. The apparatus, process, and system of the present invention inhibits and/or prevents the man-in-the-middle attack, which is a problem that has not been solved to this day.

3 Claims, 8 Drawing Sheets

US 11,201,732 B1

PRIVATE AND PUBLIC KEY EXCHANGE METHOD PREVENTING MAN-IN-THE-MIDDLE ATTACK WITHOUT ELECTRONIC CERTIFICATE AND DIGITAL SIGNATURE

FIELD OF THE INVENTION

This invention relates to network security, and more particularly to encryption key exchange.

BACKGROUND OF THE INVENTION

Cryptography is the process of changing the content of a message so that no one can read or understand it without the use of another process that reverts the original content back. The first process that alters the original message is called encryption, while the second process that reverts the original message is called decryption. Cryptography is not a new concept, it has been around since 1975. Before its inception, information sharing between two parties was considered problematic, especially in two different scenarios:

If two people who have never met are to communicate privately, they must somehow agree in advance on a secret word (known as key) that would be known to themselves and to no one else;

If one person is to distribute a message with a way of demonstrating to other people it had come from a particular person, just as a written signature that allows the recipient to hold the author to its contents.

Current widely used methods for encryption and decryption fail to protect information sharing.

To date, Deffie-Hellman and RSA (initials stand for Rivest, Shamir, and Adleman) are commonly used in public key encryption. Unfortunately, both of Deffie-Hellman and RSA are not perfect-secure against many kinds of attacks. For example, many attempts used the 'discrete logarithm problem' attack to successfully break the security scheme of Deffie-Hellman. In addition, the security of RSA has had many successful attacks based on the 'factorization of big integer' process. To overcome such harmful processes, Deffie-Hellman and RSA always recommend to increase the encryption key (large in bit size, comprising public parameters Modulus P, Base a, and large Modules' Arithmetic Number N), which makes the network communication slower.

The RSA algorithm is an example of a "trapdoor function", an operation that is easy to do but hard to reverse without additional information. The algorithm is based on the fact that there is no efficient way to factor very large numbers. These kinds of factorizations cannot be done easily and quickly. Thus, the security of RSA based on the factorization of large numbers is difficult. This algorithm is secure based on that it is hard to factorize the large integer N. In addition to analyzing the previous work of Deffie-Hellman and RSA, analysis of different art-of-state hacking algorithms showed that they succeed to break the security of these algorithms. For example, Wiener's Attack uses Wiener's theorem and continued fractions definition to approximate the private key.

Furthermore, to increase security between communicating parties, users depend on a third trusted party (known as Certificate Authorities) and Digital Signatures to generate and distribute the public and private keys. This method faces another weakness of security (the man-in-the-middle attack). The security of this invention is not based on any third trusted parties, unlike the previous algorithms.

SUMMARY OF THE INVENTION

One or more embodiments of the present invention provide a new apparatus, process, and system, that enables secure information and communication across channels. The secure channel between two users enables each to use the public key of the other user—to derive a shared secret (secret key) specific to both users. A comparison between previous work and one or more embodiments of the present invention shows that this method supersedes current methods with regards to encryption keys length, key factorization, and the man-in-the-middle attack.

One or more embodiment of the present invention provide a private key that makes the discrete logarithm method impossible to calculate, because the exponents in $(\propto_1^{a_1} \times \propto_2^{a_2})$ mod p are different, and hidden by each other. In addition, the linear relation (s) between the exponents gives no information about $a_1$ and $a_2$. One or more embodiments of the present invention provide perfect-secure (information theoretically secure), because the public key (n,s) gives no information about $(a_1, a_2)$ private key.

One or more embodiments of the present invention provide a method comprising: using one or more computer processors to randomly select a first set of two large numbers $(a_{1,A}, a_{2,A})$, for a first user A, at least one of the first set of two large numbers being a prime number; using one or more computer processors to randomly select a second set of two large numbers $(a_{1,B}, a_{2,B})$, for a second user B, at least one of the second set of two large numbers being a prime number; using one or more computer processors to determine a first user A public key, wherein the first user A public key is based on the first set of two large numbers, and a set of predefined public parameters including a modulus (p) and a base $(a_1, a_2)$.

The method may further include using one or more computer processors to determine a second user B public key, wherein the second B user public key is based on the second set of two large numbers, and the set of predefined public parameters; using one or more computer processors to calculate a value $k_A$ for the first user A as follows: $k_A = [(n_B^{a_{2,A}})^{-1} \mod p \times (\propto_1^{s_B})^{a_{2,A}} \mod p] \mod p$; wherein $n_B$ is calculated by one or more computer processors for the second user B as $(\propto_1^{a_{1,B}} \times \propto_2^{a_{2,B}}) \mod p$; and $s_B$ is calculated by one or more computer processors for the second user B as $(a_{1,B} + a_{2,B})$.

The method may further include using one or more computer processors to calculate a value $k_B$ for the second user B as follows: $k_B = [(n_A^{a_{2,B}})^{-1} \mod p \times (\propto_1^{s_A})^{a_{2,B}} \mod p] \mod p$. wherein $n_A$ is calculated by one or more computer processors for the first user A as $(\propto_1^{a_{1,A}} \times \propto_2^{a_{2,A}}) \mod p$; and $s_A$ is calculated by one or more computer processors for the first user A as $(a_{1,A} + a_{2,A})$; using one or more computer processors to encrypt a first message using $k_A$; to form a first encrypted message; and sending the first encrypted message from a computer processor controlled by the first user A to a computer processor controlled by the second user B.

The method may further include using one or more computer processors to encrypt a second message using $k_B$, to form a second encrypted message; sending the second encrypted message from a computer processor controlled by the second user B to a computer processor controlled by the first user A; using one or more computer processors controlled by the first user A to decrypt the second encrypted message using $k_A$; and using one or more computer processors controlled by the second user B to decrypt the first encrypted message using $k_B$; and providing an indication in one or more computer memories that neither the first user A nor the second user B is a hacker if $k_A$ is determined to equal $k_B$.

In at least one embodiment of the present invention $k_A$ is a cryptographic key used to encrypt the first message and decrypt the second encrypted message in a first key cryptography method; and wherein $k_B$ is a cryptographic key used to encrypt the second message and decrypt the first encrypted message in a second key cryptography method.

The first key cryptography method may be a symmetric key cryptography method; and the second key cryptography method may be a symmetric key cryptography method.

The first key cryptography method may be an asymmetric key cryptography method; and the second key cryptography method may be an asymmetric key cryptography method.

On the of the first key cryptography method may be a symmetric key cryptography method; and the second key cryptography method is an asymmetric key cryptography method.

The symmetric key cryptography method may be one of AES (Advanced Encryption Standard), and 3DES (Triple Data Encryption Algorithm)

The asymmetric cryptography method may be one of DSA (Digital Signature Algorithm) and Elliptic Curve Cryptography.

In at least one embodiment of the present application a method is provided comprising using one or more computer processors to calculate a first unique key $x_A$ wherein $x_A = U_A MAC_A Pk_A$ for a first user A; wherein $U_A$ is a unique identification number for the first user A; wherein $MAC_A$ is a unique identification number for a computer processor controlled by the first user A; wherein $Pk_A$ is a public key of the first user A; and further comprising using one or more computer processors to encrypt the first unique key $x_A$ using a public key from a server computer to form an encrypted first unique key $y_A$; sending the encrypted first unique key $y_A$ to the server computer; and sending the encrypted first unique key $y_A$ to one or more computer processors controlled by a second user B.

The method may further include using one or more computer processors to calculate a second unique key $x_B$ wherein $x_B = U_B MAC_B Pk_B y_A$ for the second user B; wherein $U_B$ is a unique identification number for the second user B; wherein $MAC_B$ is a unique identification number for a computer processor controlled by the second user B; and wherein $Pk_B$ is a public key of the second user B.

The method may further include using one or more computer processors to encrypt the second unique key $x_B$ using the public key from the server computer to form an encrypted second unique key $y_B$; sending the encrypted second unique key $y_B$ to the server computer; and sending the encrypted second unique key $y_B$ to one or more computer processors controlled by the first user A.

The method may further include using the server computer to decrypt $y_B$ to obtain $x_B$ by using a private key of the server computer; using the server computer to extract $U_B$ and $MAC_B$ from $x_B$ by accessing a first element of the user name $U_B$ and a second element of the unique identification number of a computer processor controlled by the second user B MAC, from the decrypted message $x_B$, and to verify that $U_B$ and $MAC_B$ belongs to the second user B; using the server computer to extract $y_A$ from $x_B$ by accessing a last element of the encrypted first unique key $y_A$ from the decrypted message $x_B$; using the server computer to decrypt $y_A$ to obtain $x_A$ by using the private key of the server computer; and sending the decrypted key $x_A$ to one or more computer processors controlled by the second user B.

The method may further include using one or more computer processors under the control of the second user B to encrypt $x_A$ using the public key from the server computer, to obtain $y_A$, using one or more computer processors under the control of the second user B to compare $y_A$, and to verify that $y_A$ is the same as received from the first user A, and confirm that $y_A$ was not changed during communication between one or more computer processors under control of the first user A and one or more computer processors under control of the second user B; using one or more computer processors, under control of the first user A, to calculate $R_1 = y_A y_B$; using one or more computer processors, under control of the first user A, to encrypt $R_1$ using the public key from the server computer to form an encrypted message $R_2$; sending the encrypted message $R_2$ to the server computer; and using the private key of the server computer to decrypt $R_2$ to obtain $R_1$, wherein the server computer extracts $y_B$ by accessing a second element in $R_1$, and verifies that $y_B$ belongs to the second user B, decrypts $y_B$ using the private key of the server computer to obtain $x_B$, and sends $x_B$ to the first user A.

The method may further include using one or more computer processors under control of the first user A to encrypt $x_B$ by using the server public key, to obtain $y_B$, wherein the first user A, using one or more computer processors compares $y_B$, verifies that $y_B$ is the same as received from one or more computer processors controlled by the second user B; and confirms that $y_B$ was not changed during communication between one or more computer processors under control of the first user A and one or more computer processors under control of the second user B.

DETAILED DESCRIPTION OF THE DRAWINGS

Figure 1A:
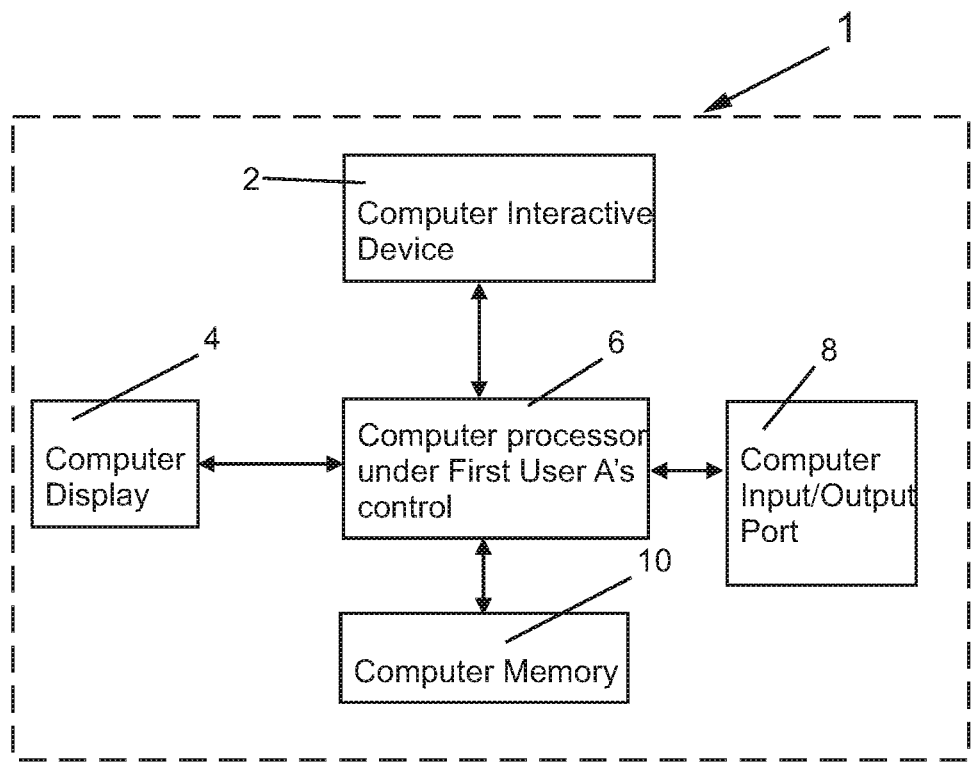
FIG. 1A shows a simplified diagram of an apparatus for use by a first user A in accordance with one or more embodiments of the present invention including a computer interactive device, a computer display, a computer processor under first user A's control, a computer input/output port, and a computer memory.

FIG. 1A shows a simplified diagram of a first user A computer 1 for use in accordance with one or more embodiments of the present invention including a computer interactive device 2, a computer display 4, a computer processor 6 under a first user A's control, a computer input/output port 8, and a computer memory 10. The computer processor 6 may include one or more computer processors. The computer memory 10 may include one or more computer memories. The computer interactive device 2 may include one or more computer interactive devices. The computer interactive device 2 may be one or more computer mice, computer touch screens, computer keyboards, or any other known computer interactive devices. The computer display 4 may include one or more computer displays. The computer input/output port 8 may include one or more computer input/output ports.

Figure 1B:
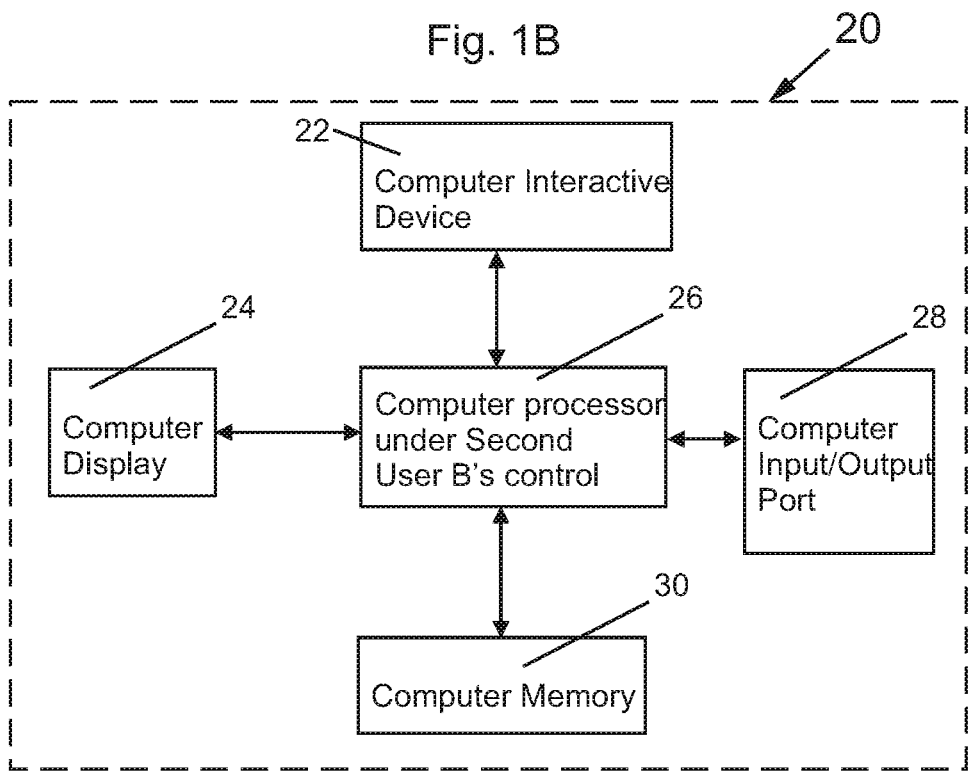
FIG. 1B shows a simplified diagram of an apparatus for use by a second user B in accordance with one or more embodiments of the present invention including a computer interactive device, a computer display, a computer processor under second user B's control, a computer input/output port, and a computer memory.

FIG. 1B shows a simplified diagram of a second user B computer 20 for use in accordance with one or more embodiments of the present invention including a computer interactive device 22, a computer display 24, a computer processor 26 under a second user B's control, a computer input/output port 28, and a computer memory 30. The computer processor 26 may include one or more computer processors. The computer memory 30 may include one or more computer memories. The computer interactive device 22 may include one or more computer interactive devices. The computer interactive device 22 may be one or more computer mice, computer touch screens, computer keyboards, or any other known computer interactive devices. The computer display 24 may include one or more computer displays. The computer input/output port 28 may include one or more computer input/output ports.

Figure 1C:
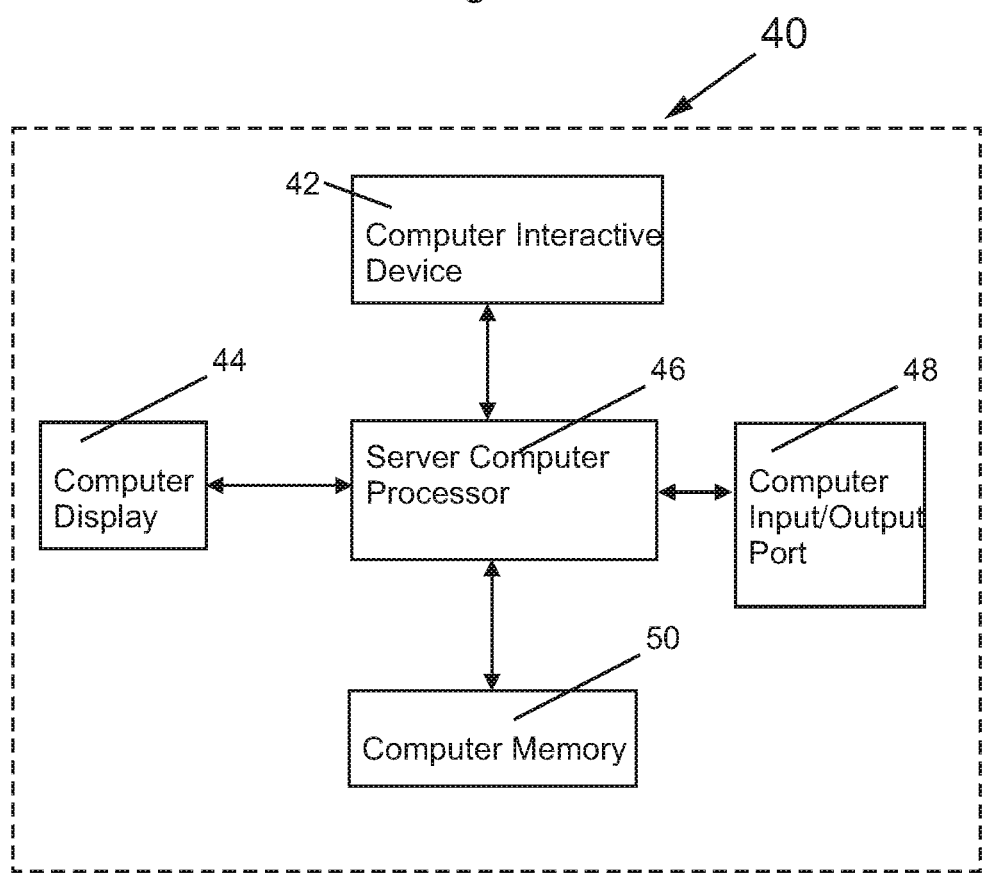
FIG. 1C shows a simplified diagram of an apparatus or server computer in accordance with one or more embodiments of the present invention including a computer interactive device, a computer display, a server computer processor, a computer input/output port, and a computer memory.

FIG. 1C shows a simplified diagram of a server computer 40 for use in accordance with one or more embodiments of the present invention including a computer interactive device 42, a computer display 44, a server computer processor 46, a computer input/output port 48, and a computer memory 50. The server computer processor 46 may include one or more computer processors. The computer memory 50 may include one or more computer memories. The computer interactive device 42 may include one or more computer interactive devices. The computer interactive device 42 may be one or more computer mice, computer touch screens, computer keyboards, or any other known computer interactive devices. The computer display 44 may include one or more computer displays. The computer input/output port 48 may include one or more computer input/output ports.

Figure 2:
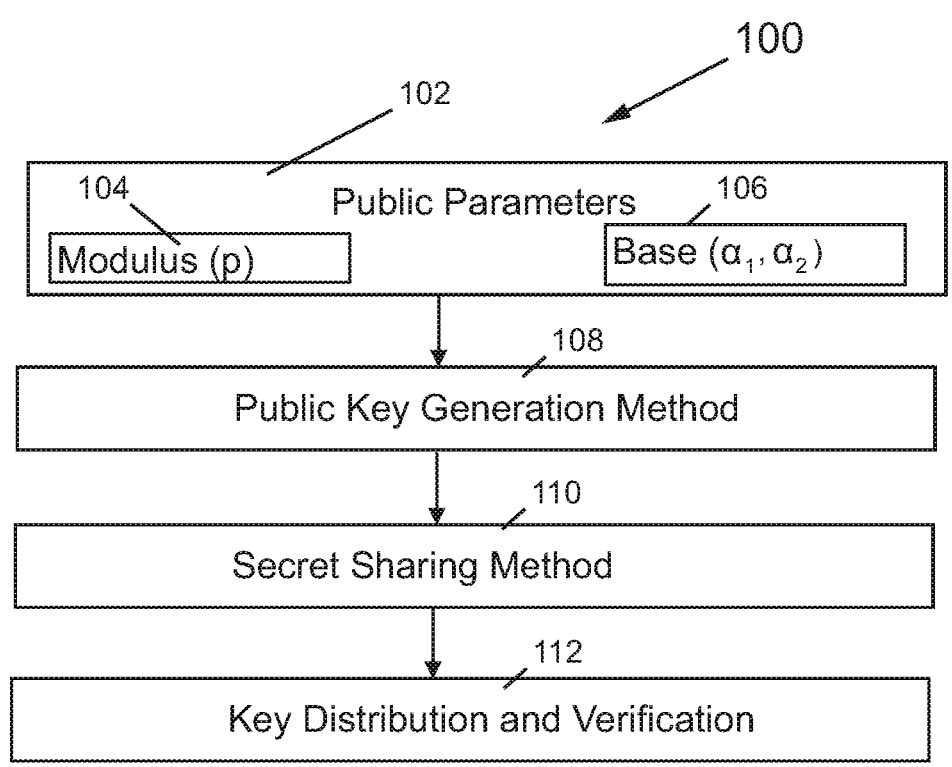
FIG. 2 shows a high level representation diagram of one or more methods to be executed by the computer processor of FIG. 1, including use of public parameters, a public key generation method, a secret sharing method, and a key distribution and verification method.

FIG. 2 shows a high level representation diagram 100 of one or more methods to be executed by one or more of the computer processors 6, 26, and 46 of FIGS. 1A, 1B, and 1C, respectively, in accordance with computer software stored in one or more of computer memories 10, 30, and 50 of FIGS. 1A, 1B, and/or 1C, respectively, including use of public parameters at step 102 (typically executed separately by both computer processors 6 and 26), a public key generation method 108 (typically executed separately by both computer processors 6 and 26), a secret sharing method 110 (typically executed separately by both computer processors 6 and 26), and a key distribution and verification method 112 (executed by first user A computer processor 6, second user B computer processor 26, and server computer processor 46). The public parameters may include a modulus 104 or modulus (p) and a base 106 or base ($a_1$, $a_2$).

Figure 3:
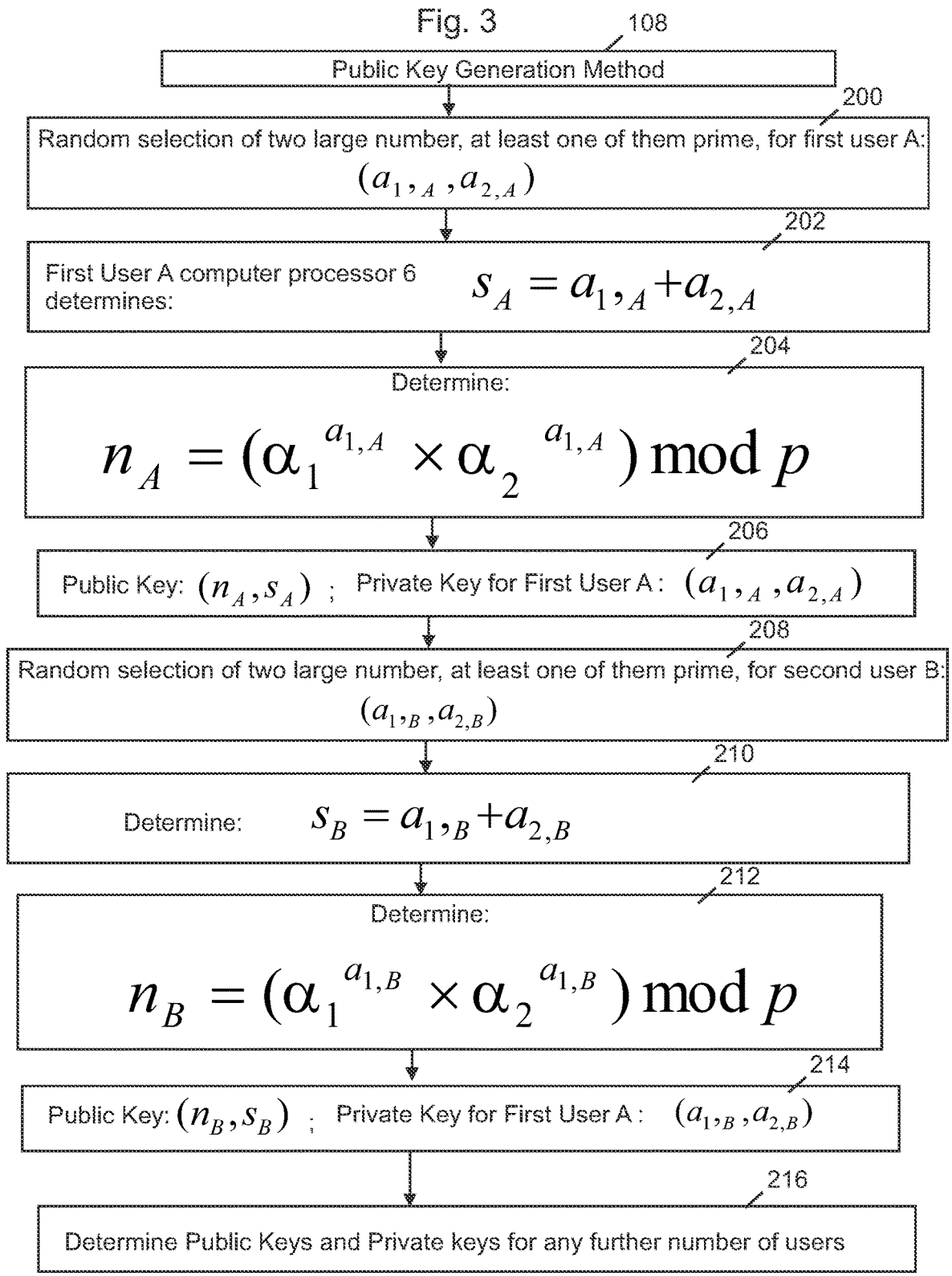
FIG. 3 is a detailed diagram of the public key generation method referred to in FIG. 2.

FIG. 3 is a detailed diagram of the public key generation method 108 referred to in FIG. 2. The public key generation method 108 is executed separately by both first user A computer processor 6 and second user B computer processor 26 in accordance with computer software stored in computer memories 10, and 30, respectively. The public key generation method refers to a first user A controlling computer processor 6, who may be using a computer interactive device 2, such as a personal computer, smart phone or tablet computer, a second user B controlling computer processor 26, who may be using a computer interactive device 2, such as a personal computer, smart phone or tablet computer, and any further number of users controlling any further number of computer processors through any further number of computer interactive devices. At step 200, the first user A computer processor 6 executes a random selection of two large numbers for the first user A, at least one of these being a prime number. The two large numbers are shown as ($a_{1,A}$, $a_{2,A}$) and are stored in computer memory 10.

At step 202, the first user A computer processor 6 calculates $S_A$ as programmed by computer software stored in computer memory 10.

A step 204 the first user A computer processor 6 determines as programmed by computer software stored in computer memory 10

At step 206 a public key, which is ($n_A$, $s_A$) is determined by the first user A computer processor 6 and stored in computer memory 10, as programmed by the computer memory 10. In addition, ($a_{1,A}$, $a_{2,A}$) Is stored in computer memory 10 as a private key for the first user A.

At step 208, the second user B computer processor 26 executes a random selection of two large numbers for the second user B, at least one of these being a prime number. The two large numbers are shown as ($a_{1,B}$, $a_{2,B}$) and are stored in computer memory 30.

At step 210, the second user B computer processor 26 calculates $S_B$ as programmed by computer software stored in computer memory 30.

A step 212 the second user B computer processor 26 determines $n_B$ as programmed by computer software stored in computer memory 30

At step 214 a public key, which is ($n_B$, $s_B$), is determined by the second user B computer processor 26 and stored in computer memory 30, as programmed by the computer memory 30. In addition, ($a_{1,B}$, $a_{2,B}$) Is stored in computer memory 30 as a private key for the second user B.

At step 216, public keys and private keys are determined in a similar and/or identical manner by one or more further computer processors, similar or identical to computer processors 6 and 26, for one or more further users.

Figure 4:
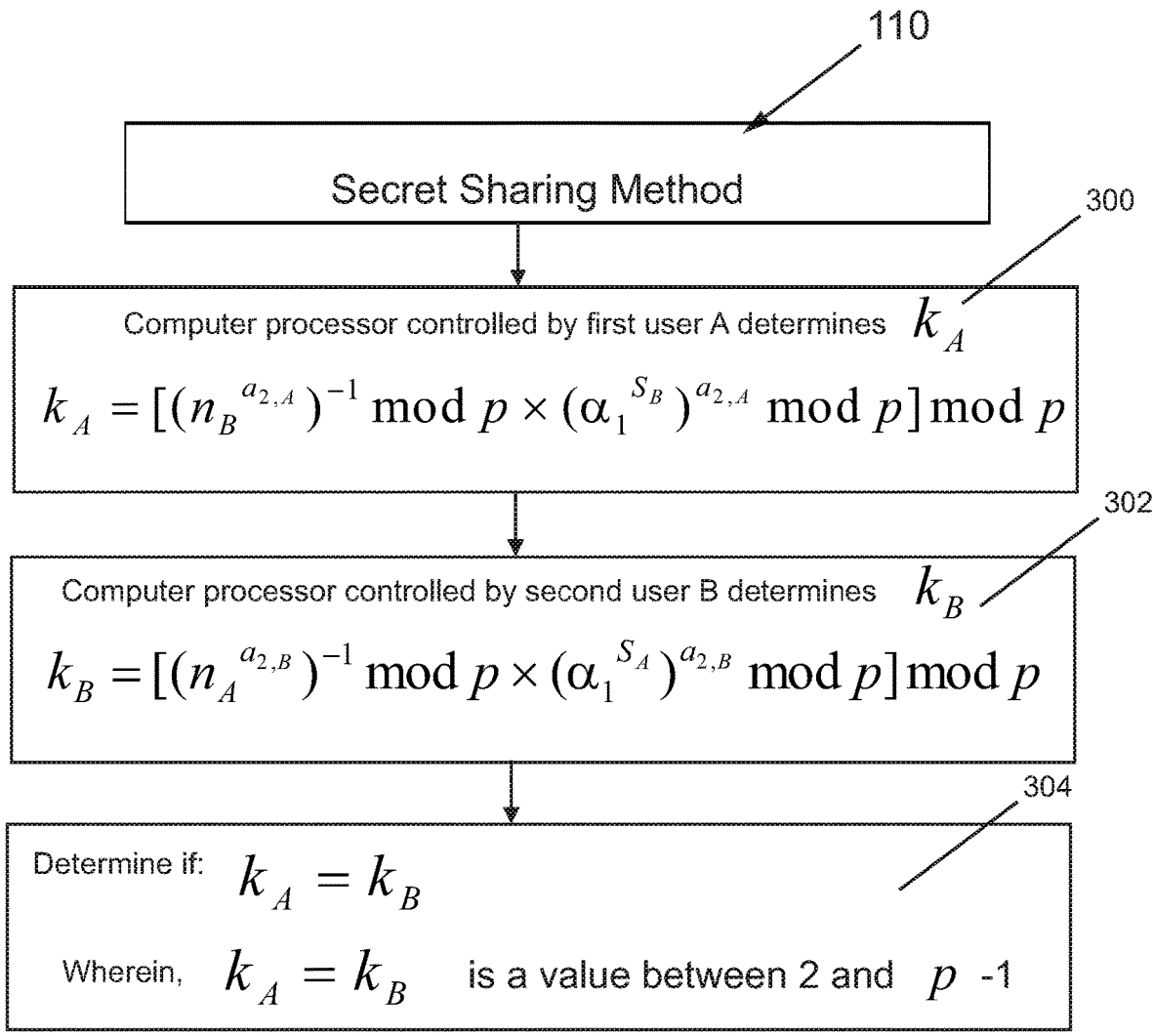
FIG. 4 is a detailed diagram of the secret sharing method referred to in FIG. 2.

FIG. 4 is a detailed diagram of the secret sharing method 110 referred to in FIG. 2. At step 300 the computer processor 6 controlled by the first user A, determines a unique key $k_A$ and this may be stored in computer memory 10. B At step 302 the computer processor 26 controlled by the second user B, determines a unique key $k_B$ and this may be stored in computer memory 30.

The unique keys $k_A$ and $k_B$ are to be used for the communications (encryption and decryption processes) between the first user A computer processor 6 and the second user B computer processor 26.

The value of $k_A$ is used to encrypt a message programmed to be sent by the computer processor 6, via input/output port 8 to the input/output port 28 and received by the computer processor 26 controlled by the second user B and decrypt a message received at the first user A computer processor 6 from the computer processor 26 controlled by the second user B, via the input/output ports 8 and 28.

The value of $k_B$ is used to encrypt a message sent by the second user B computer processor 26 to the first user A computer processor, via the input/output ports 6 and 8, and decrypt a message coming from the first user A computer processor 6 to the second user B computer processor 26, via the input/output ports 6 and 8.

At step 304 if the two user computer processors 6 and 26 end up with the same value ($k_A=k_B$), the key exchange method is satisfied (i.e., the messages between the two users, first user A and second user B would be encrypted and decrypted correctly, allowing the two users A and B to correctly communicate with each other).

The value of ($k_A=k_B$) should be a value between 2 and p −1.

Figure 5:
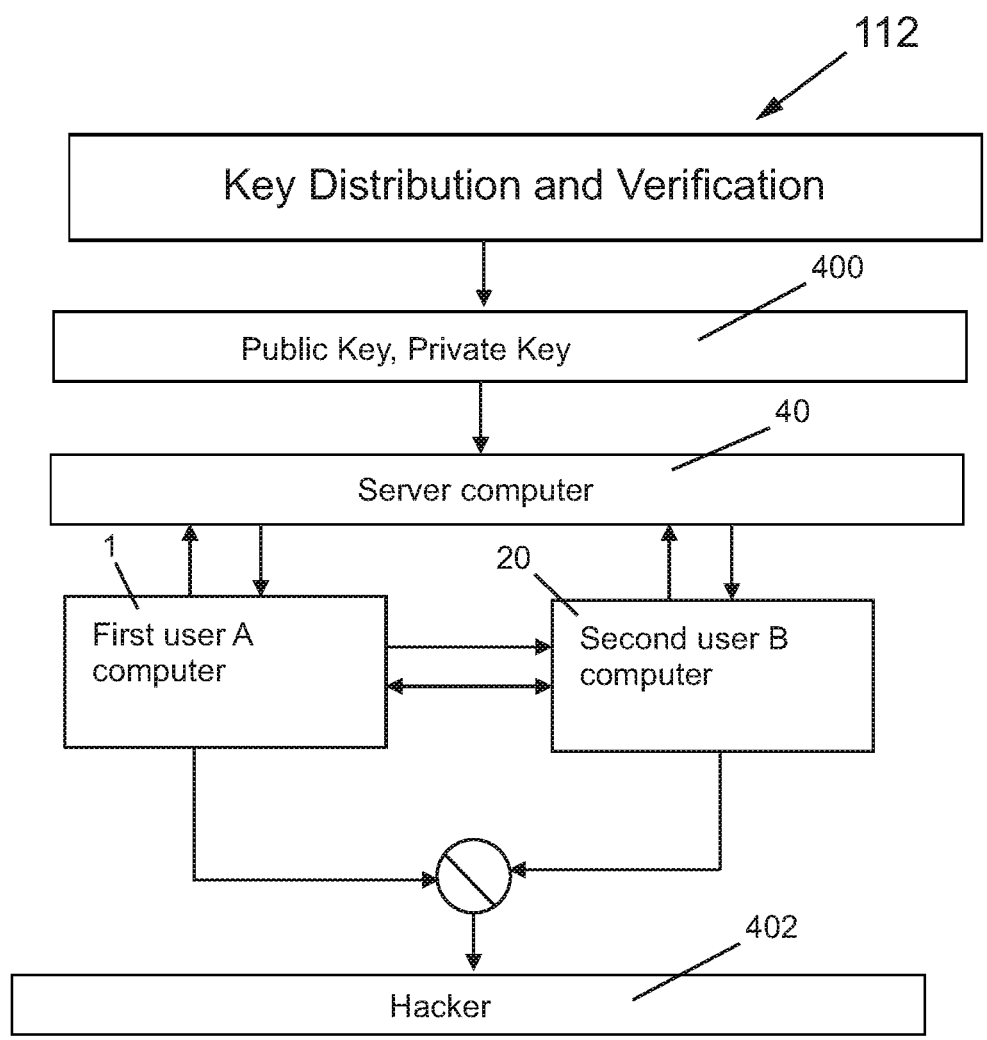
FIG. 5 is a top level diagram of the key distribution and verification method referred to in FIG. 2.

FIG. 5 is a top level diagram of the key distribution and verification method 112 referred to in FIG. 2. A module 400 refers to a private key, and a public key. The public key from the method a of FIG. 3 is accessed by all players or users, such as the first user A and the second user B, and a the appropriate private key from the method of FIG. 3 is accessed by its owner, i.e. one private key for the first user A and one private key for the second user B, and a private key for each of any number of further users. The top level diagram of FIG. 5 refers to the server computer 40, the first user A computer 1, and the second user B computer 20. The server computer 40 has communications links with and from both the first user computer A 1 and the second user computer B 20. The computers 1 and 20 have communications links with one another. A hacker 402, may attempt to intercept communications between first user A computer 1 and second user B computer 20, and/or may attempt to imitate one of the computers 1 and 20 to improperly receive data and/or communications meant for computer 1 or computer 20.

The server computer processor 46 of server computer 40 for a communication is accessed by each user computer processor, or processors 6 and 26, to decrypt each user's private key and send it to the other user. The first user A computer processor 6 verifies the keys sent by server computer processor 46 and the second User B computer processor 26. The second user B computer processor 26 verifies the keys sent by the server computer processor 46 and the first User A computer processor 6. In at least one embodiment a hacker will never be able guess, and/or it will be very difficult to guess, the keys communicated between computers 1, 20, and 40 and between computer processors 6, 26, and 46.

One or more embodiments of the present invention introduce a new scheme that allows any user, such as a user of a personal computer, tablet computer, or smart phone accessing the server computer processor 46 through input/output port 48 and through the internet and/or some other network, such as a first user A or a second user B using first user A computer processor 6 or second user B computer processor 26, respectively, to share a secret or private key such as ($a_{1,A}$, $a_{2,A}$) for the first user A and ($a_{1,B}$, $a_{2,B}$) for the second user B with any other user on a network, without giving any other information about that secret or private key to the other user. A perfect key exchange scheme is defined as follows.

Definition (perfect key exchange scheme): A key exchange scheme is said to be a perfect if two parties share the secret or private key in an unsecure channel and they give no information about that secret key for others.

Note that if the scheme is perfect then it is unconditionally secure (information theoretically secure). RSA (initials stand for Rivest, Shamir, and Adleman) and similar/derived algorithms are under attack by the fact that the big Integer is known, and it is subject to factorization. The key exchange method with public Modules' Arithmetic Number N in one or more embodiments of the present invention is different from the other methods that use Deffie-Hellman and RSA (like the Advanced Encrypten Standard AES, Certificate Authorities, and Digital Signatures). The current process of one or more embodiments of the present invention is secure under any computational assumption. The only way that an attacker or hacker 402 shown in FIG. 5 can break this method is by using a brute-force attack. The brute-force attack needs thousands of years, to hack a first user A computer processor 6 (or second user B computer processor 26), using one in many private keys in a network, using hundreds of personal computers, for hundreds of users.

The information theoretically secure key exchange process of one or more embodiments of the present invention is comprised of the following two methods. Suppose that alphas ($a_1$, $a_2$) of the base 106 shown in FIG. 2 are two prime numbers, and p is a large prime number. The primes ($a_1$, $a_2$) and p are public parameters of an overall method in accordance with an embodiment of the present invention.

One or more embodiments of the present invention generate a strong secure shared key ($k_A$ for the first user A, and $k_B$ for the second user B) at steps 300 and 302 in FIG. 4. This key enables the use of any kind of symmetric encryption (the key used in encryption and decryption is the same). If the two user computer processors 6 and 26 end up with the same value ($k_A=k_B$), the key exchange method is satisfied (i.e., the messages between the two users would be encrypted and decrypted correctly, allowing the two users to correctly communicate with each other).

The man-in-the-middle attack is the most known problem that current (and past) security algorithms face. This attack exists because of the existence of the distributed public key. Security algorithms use the third trusted parties to distribute and save the public and private keys. They further use Digital Signatures to verify that keys belong to the intended users. This issue makes the information transfer between users to be unsecure because third parties know the public and private keys too. To solve the issue, certificate authorities exist to distribute keys, and Digital Signatures exist to verify users, to protect the schemes from the man-in-the-middle attack. However, certificate authorities and Digital Signatures still get attacked, because they are generated based on Diffie-Hellman key exchange and RSA algorithms, which are not information theoretically secure as explained previously.

To prevent third party vendors from reading the information shared between users, and to prevent the man-in-the-middle attack (for the key distribution and verification), one or more embodiments of the present invention improves the process to work as shown in FIG. 5. An overall method of one or more embodiments of the present invention hides the secrete keys or private keys shown at step 200 and 208 of FIG. 3, while communicating with the server computer 46 (i.e., it gives no information about the party's secret or private keys from step 200 or 208 of FIG. 3. The proposed scheme is an end-to-end encryption, in the following ways:

It is not based on any computational assumption.

The authentication and verification processes (depicted in FIGS. 5 and 6A-6B) are imbedded in the method as programmed in computer memory 50 of the server computer 40 of FIG. 1C, (e.g., transferring the secure public keys satisfies the method or process to be information theoretically secure (perfect secure).

Preventing the man in the middle attack by introducing the workflow depicted in FIG. 5; and by making it impossible to find the keys shown in steps 200 and 208 (using a brute-force attack) when the shared keys shown in steps 200 and 208 of FIG. 3 length is up to 2048 binary bits.

Although at least one embodiment of the present invention has been explained for a first user A and a second user B, the invention can be applied to one or more embodiments for any number of users.

Figure 6A:
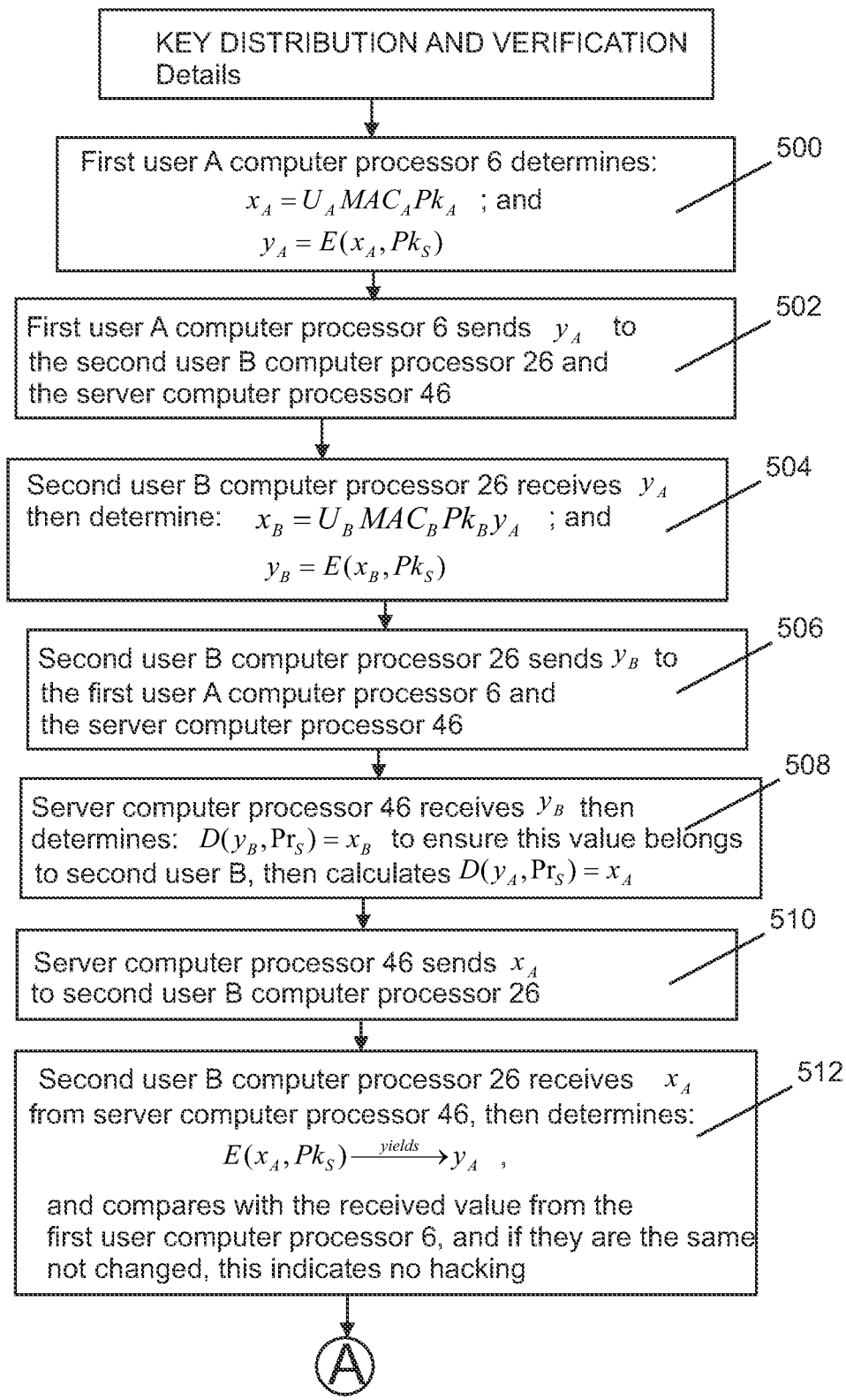
FIG. 6A is a first part of a detailed diagram of the key distribution and verification method referred to in FIG. 2.
Figure 6B:
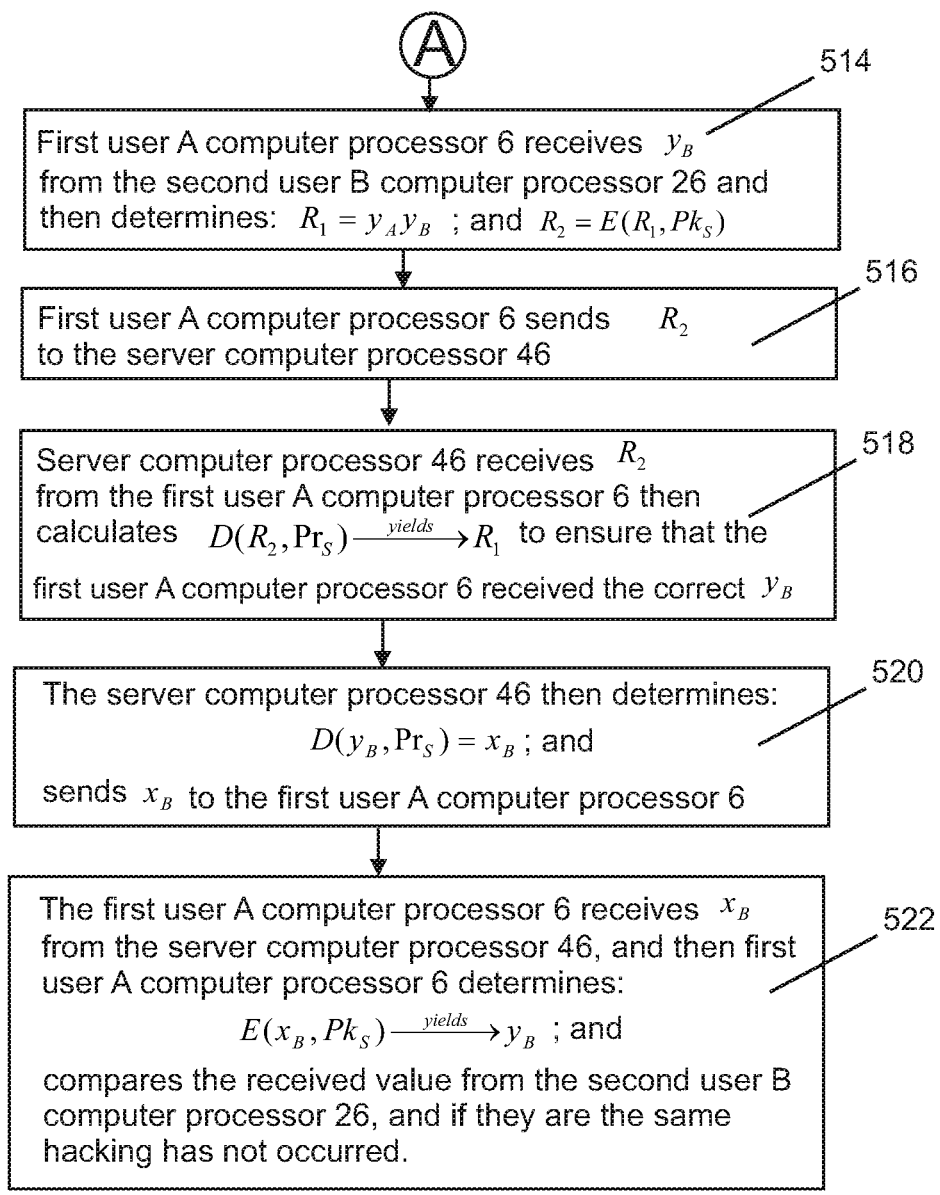
FIG. 6B is a second part of a detailed diagram of the key distribution and verification method referred to in FIG. 2.

FIG. 6A is a first part of a detailed diagram of the key distribution and verification method 112 referred to in FIG. 2; and FIG. 6B is a second part of a detailed diagram of the key distribution and verification method 112 referred to in FIG. 2.

At step 500 of FIG. 6A, the first user A computer processor 6 determines:

$x_A = U_A MAC_A Pk_A$; and $y_A = E(x_A, Pk_S)$ wherein $x_A$ is a first unique key for the first user A;

wherein $U_A$ is a unique identification number for the first user A;

wherein $MAC_A$ is a unique identification number for the computer processor 6 controlled by the first user A;

wherein $Pk_A$ is a public key of the first user A;

wherein $y_A$ is an encrypted first unique key, i.e. and encryption of $x_A$;

wherein $Pk_S$ is a public key of the server computer processor 46;

and wherein E stands for encryption operator.

At step 502, the first user A computer processor 6 sends $y_A$ to the second user B computer processor 26 and the server computer processor 46.

At step 504, the second user B computer processor 26 receives $y_A$ and determines $x_B = U_B MAC_B Pk_B y_A$; and $y_B = E(x_B, Pk_S)$ wherein $x_B$ is a second unique key for the second user B;

wherein $U_B$ is a unique identification number for the second user B;

wherein $MAC_B$ is a unique identification number for the computer processor 26 controlled by the second user B;

wherein $Pk_B$ is a public key of the second user B; and wherein $y_B$ is an encrypted second unique key, i.e. and encryption of $x_B$.

At step 506, the second user B computer processor 26 sends $y_B$ to the first user A computer processor 6 and to the server computer processor 46.

At step 508 the server computer processor 46 receives $y_B$ and then determines a decryption, $D(y_B, Pr_S) = x_B$ wherein $Pr_S$ Is a private key of the server computer processor 46, to ensure that the value $y_B$ belongs to the second user B, then the server computer processor 46 calculates $D(y_A, Pr_S) = x_A$ At step 510 the server computer processor 46 sends $x_A$ to the second user B computer processor 26.

At step 512, the second user B computer processor 26 receives $x_A$ from the server computer processor 46 then determines an encryption $$E(x_A, Pk_S) \xrightarrow{yields} y_A$$

wherein $Pk_S$ is the public key of the server computer processor 46.

The second user B computer processor 26 compares the encryption of step 512 with the received value from the first user computer processor 6 and if these are the same, then an indication is stored in computer memory 30 that hacking has not occurred, and the second user B computer processor 26 will not prevent communications between processors 6 and 26.

The method continues to step 514, as shown by node A on FIG. 6A, which is also shown on FIG. 6B.

At step 514, the first user A computer processor 6 receives $y_B$ from the second user B computer processor 26 and then determines $R_1 = y_A y_B$; and $R_2 = E(R_1, Pk_S)$.

At step 516, the first user A computer processor 6 sends $R_2$ to the server computer processor 46.

At step 518, the server computer processor 46 receives $R_2$ from the first user A computer processor 6 and then calculates $$D(R_2, Pr_S) \xrightarrow{yields} R_1$$

to ensure that the first user A computer processor 6 received the correct $y_B$.

At step 520, the server computer processor 46 then determines $D(y_B, Pr_S) = x_B$; and sends $x_B$ to the first user A computer processor 6.

At step 522 the first user A computer processor 6 receives $x_B$ From the server computer processor 46 and then first user A computer processor 6 determines $$E(x_B, Pk_S) \xrightarrow{yields} y_B;$$

and compares the received value from the second user B computer processor 26, and if they are the same, and indication is stored in computer memory 10 that hacking has not occurred and the first user A computer processor 6 will not prevent communications between processors 6 and 26.

If both computer processors 6 and 26 are not preventing communications between the processors 6 and 26, i.e. if both processors 6 and 26 have set indications that hacking has not occurred, then communications are allowed to occur between processor 6 and 26.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

We claim:

1. A method comprising:

using one or more computer processors to randomly select a first set of two large numbers ($a_{1,A}$, $a_{2,A}$), for a first user A, at least one of the first set of two large numbers being a prime number;

using one or more computer processors to randomly select a second set of two large numbers ($a_{1,B}$, $a_{2,B}$), for a second user B, at least one of the second set of two large numbers being a prime number;

using one or more computer processors to determine a first user A public key, wherein the first user A public key is based on the first set of two large numbers, and a set of predefined public parameters including a modulus (p) and a base ($a_1$, $a_2$);

using one or more computer processors to determine a second user B public key, wherein the second B user public key is based on the second set of two large numbers, and the set of predefined public parameters;

using one or more computer processors to calculate a value $k_A$ for the first user A as follows: $k_A = [(n_B^{a_{2,A}})^{-1} \mod p \times (a_1^{s_B})^{a_{2,A}} \mod p] \mod p$ wherein $n_B$, is calculated by one or more computer processors for the second user B as $(a_1^{a_{2,B}}, a_2^{a_{2,B}}) \mod p$; and $s_B$ is calculated by one or more computer processors for the second user B as $(a_{1,A}, a_{2,B})$;

using one or more computer processors to calculate a value $k_B$; for the second user B as follows: $k_B = [(n_A^{a_{2,B}})^{-1} \mod p \times (a_1^{s_A})^{a_{2,B}} \mod p] \mod p$ wherein $n_A$ is calculated by one or more computer processors for the first user A as $(a_1^{a_{2,A}}, a_2^{a_{2,A}}) \mod p$; and $s_A$ is calculated by one or more computer processors for the first user A as $(a_{1,A} + a_{2,A})$;

using one or more computer processors to encrypt a first message using $k_A$, to form a first encrypted message;

sending the first encrypted message from a computer processor controlled by the first user A to a computer processor controlled by the second user B;

using one or more computer processors to encrypt a second message using $k_B$, to form a second encrypted message;

sending the second encrypted message from a computer processor controlled by the second user B to a computer processor controlled by the first user A;

using one or more computer processors controlled by the first user A to decrypt the second encrypted message using $k_A$;

using one or more computer processors controlled by the second user B to decrypt the first encrypted message using $k_B$; and providing, based on comparison of data between one or more computer processors controlled by the first user A and one more computer processors controlled by the second user B, an indication in one or more computer memories controlled by the first user A and in one or more computer memories controlled by the second user B that neither the first user A nor the second user B is a hacker when $k_A$ is determined to equal $k_B$.

2. The method of claim 1 wherein $k_A$ is a cryptographic key used to encrypt the first message and decrypt the second encrypted message in a first key cryptography method; and wherein $k_B$ is a cryptographic key used to encrypt the second message and decrypt the first encrypted message in a second key cryptography method.

3. The method of claim 2 wherein the first key cryptography method is a symmetric key cryptography method; and the second key cryptography method is a symmetric key cryptography method.

* * * * *